United States Patent
Rout et al.

(10) Patent No.: US 9,538,343 B1
(45) Date of Patent: Jan. 3, 2017

(54) DYNAMICALLY LOADING VOICE ENGINE LOCALE SETTINGS

(71) Applicant: Motorola Mobility LLC, Chicago, IL (US)

(72) Inventors: Satyabrata Rout, Karnataka (IN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/813,172

(22) Filed: Jul. 30, 2015

(51) Int. Cl.
| | |
|---|---|
| *H04W 4/12* | (2009.01) |
| *H04M 3/42* | (2006.01) |
| *H04W 4/02* | (2009.01) |
| *H04M 1/2745* | (2006.01) |

(52) U.S. Cl.
CPC ......... *H04W 4/12* (2013.01); *H04M 1/274508* (2013.01); *H04M 3/42059* (2013.01); *H04W 4/02* (2013.01)

(58) Field of Classification Search
CPC ...... H04W 4/12; H04W 4/02; H04M 3/42059; H04M 1/274508

USPC .................................................. 455/413–415
See application file for complete search history.

(56) References Cited

U.S. PATENT DOCUMENTS

| | | | | |
|---|---|---|---|---|
| 7,602,895 | B2 * | 10/2009 | Terry ................... | H04M 3/436 370/352 |
| 8,358,757 | B2 * | 1/2013 | Soo ........................ | H04M 3/54 379/201.12 |
| 2005/0100145 | A1 * | 5/2005 | Spencer ................ | H04M 3/436 379/88.22 |
| 2005/0201533 | A1 * | 9/2005 | Emam ................. | H04M 1/2535 379/88.19 |
| 2010/0215157 | A1 * | 8/2010 | Narayan ........... | H04M 3/53391 379/88.19 |

\* cited by examiner

*Primary Examiner* — Sharad Rampuria
(74) *Attorney, Agent, or Firm* — Amerson Law Firm, PLLC

(57) ABSTRACT

A method includes receiving an incoming call from a caller's device in a called device. A locale preference associated with the caller's device is determined. A voice engine in the called device is configured using locale settings associated with the determined locale preference. A query message is sent to the caller's device. A response to the query message is parsed using the voice engine. The incoming call is processed in the called device based on the response.

22 Claims, 2 Drawing Sheets

DYNAMICALLY LOADING VOICE ENGINE LOCALE SETTINGS

BACKGROUND

Field of the Disclosure

The disclosed subject matter relates generally to mobile computing systems and, more particularly, to dynamically loading voice engine locale settings.

Description of the Related Art

Various techniques are used in mobile devices to manage incoming calls. A user of a called device (referred to as a callee) may set a privacy preference, for example, so the user's device (the "called device") does not cause a disturbance during a meeting. A persons (referred to as a caller) that places an incoming call to the callee's device may be notified of the callee's "busy" status and queried regarding the importance level of the caller's call. For example, the caller may hear the message, "Hello, the person you are calling is busy right now. If you want a call back, say 'Call me back'. If it is urgent, say, 'It's urgent'." The incoming caller may respond to the query using one of the indicated command phrases. If the call is urgent, the call from the caller may be allowed to ring the called device. For non-urgent calls, the callee may be notified of the missed call from the caller with a message window so that the call may be returned later.

The querying of the incoming caller uses voice recognition to identify the response. The voice engine resident on the called device processes the received speech to attempt to decode the incoming caller's command. It is common that incoming caller and the callee may be from different geographical regions and thus speak different languages or dialects. Each party's (i.e., the caller and the callee) device has different locale settings per their preferred dialect for voice recognition. For example, a user from India would set the device locale as "English_India," and a user from the United States would set the device locale to "English_US." In scenarios where the caller and the callee have different device locale preferences, the voice engine on the called device may not be able to discern the caller's response. In addition, the language used for the query of the incoming caller is generated by the voice engine using the locale settings of the called device. It may be difficult for the caller to understand the call handling query due to a difference in dialects or language.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

Figure 1:
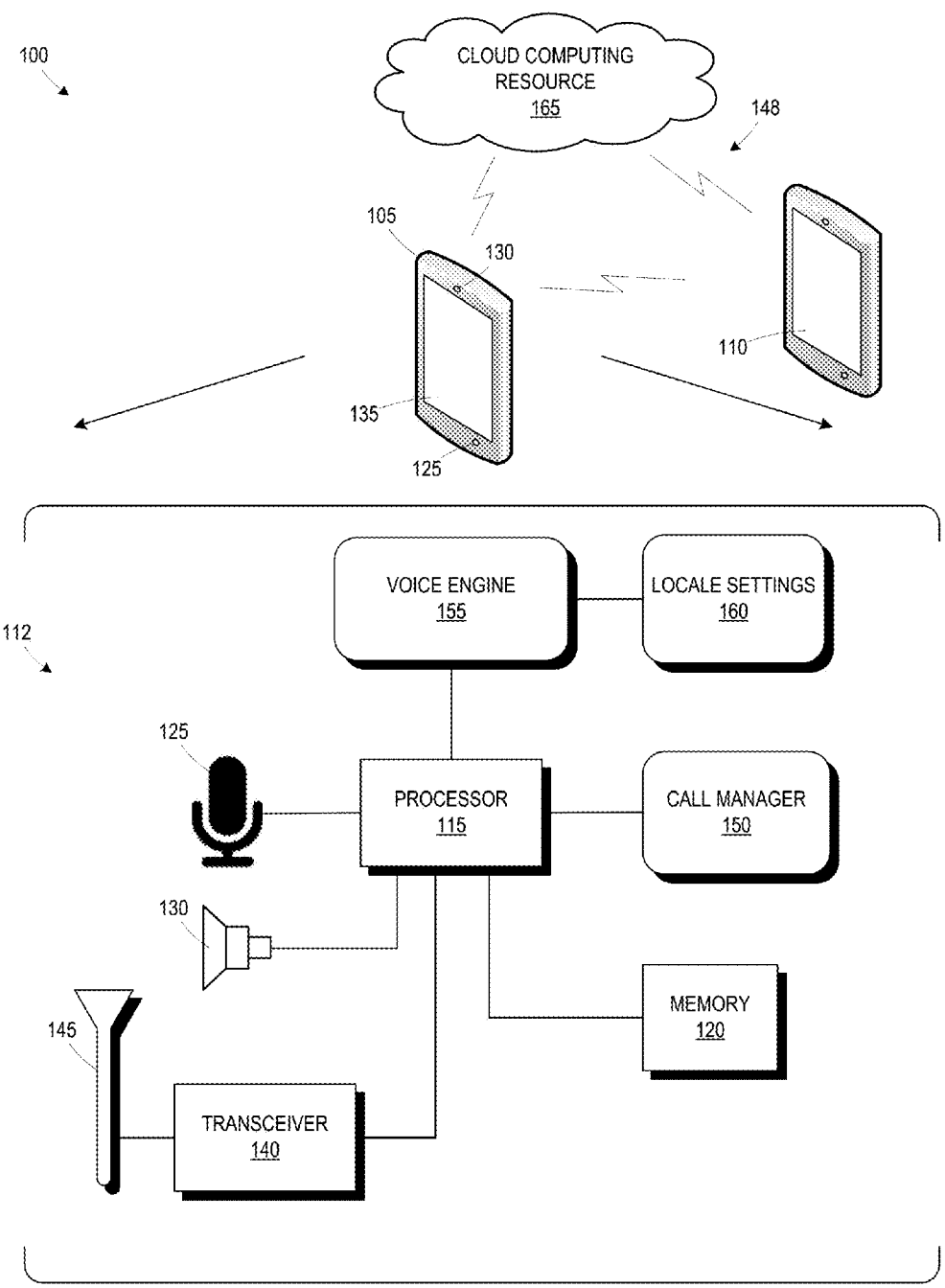
FIG. 1 is a simplified block diagram of a communication system for dynamically loading voice engine locale settings, according to some embodiments disclosed herein.
Figure 2:
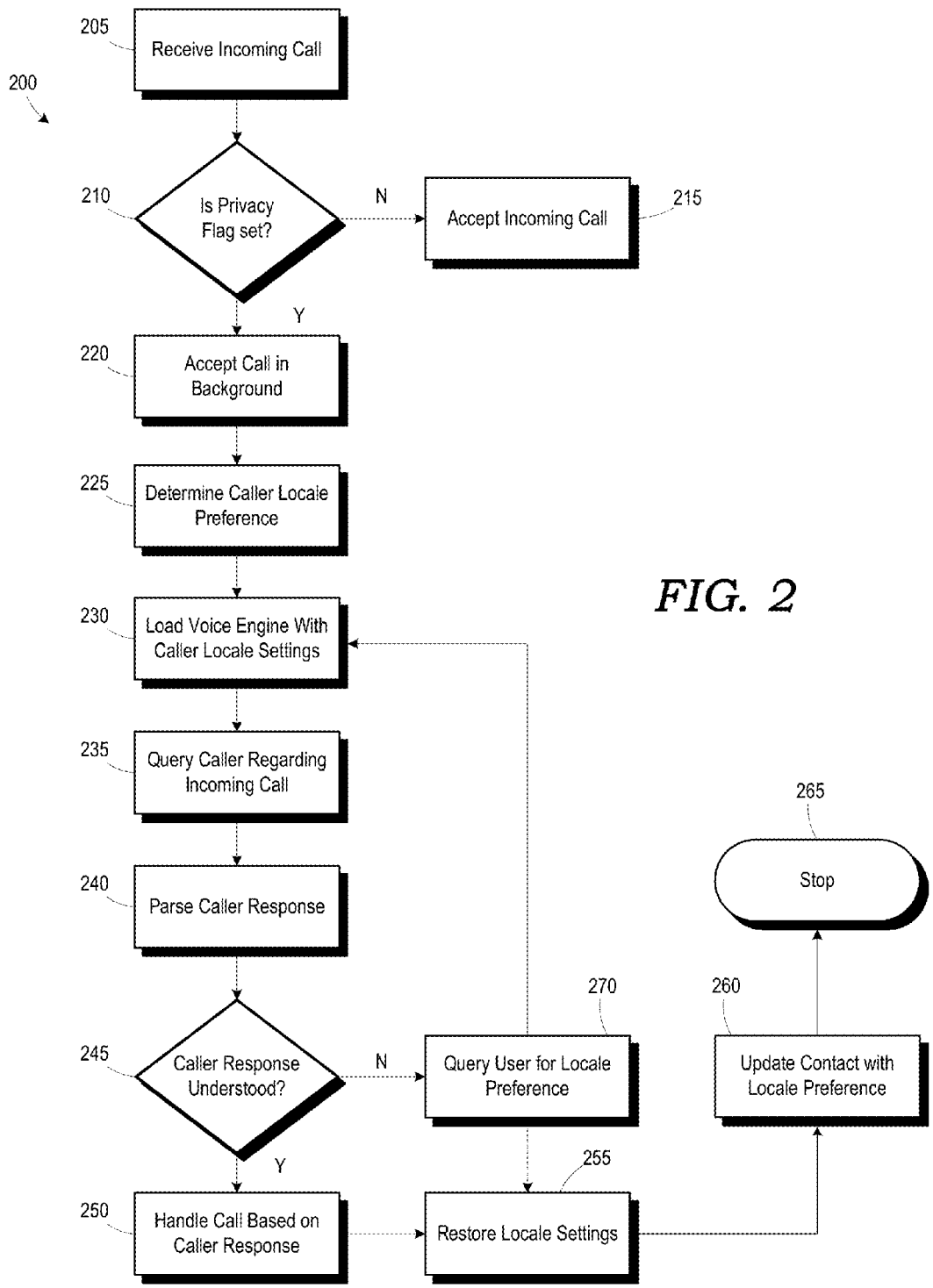
FIG. 2 is a flow diagram of a method for dynamically loading voice engine locale settings, according to some embodiments disclosed herein.

FIGS. 1-2 illustrate example techniques for queueing or dynamically loading voice engine locale settings based on incoming caller identify information. The voice engine on the called device may be temporarily loaded with the locale settings of the incoming caller to facilitate automated voice communication with the incoming caller. Dynamically loading the voice engine locale settings allows the called device to communicate with the caller using voice recognition and generation tailored to the language preferences of the caller.

FIG. 1 is a simplistic block diagram of a communications system 100 including a called device 105 that receives an incoming call from a caller device 110. The called device 105 implements a computing system 112 including, among other things, a processor 115, a memory 120, a microphone 125, a speaker 130, and a display 135. The memory 120 may be a volatile memory (e.g., DRAM, SRAM) or a non-volatile memory (e.g., ROM, flash memory, hard disk, etc.). The called device 105 includes a transceiver 140 for transmitting and receiving signals via an antenna 145 over a communication link 148. The transceiver 140 may include one or more radios for communicating according to different radio access technologies, such as cellular, Wi-Fi, Bluetooth®, etc. The communication link 148 may have a variety of forms. In some embodiments, the communication link 148 may be a wireless radio or cellular radio link. The communication link 148 may also communicate over a packet-based communication network, such as the Internet.

In various embodiments, the devices 105, 110 may be embodied in handheld or wearable devices, such as laptop computers, handheld computers, tablet computers, mobile devices, telephones, personal data assistants, music players, game devices, wearable computing devices, and the like. To the extent certain aspects of the illustrative devices 105, 110 are not described herein, such aspects may or may not be included in various embodiments without limiting the spirit and scope of the embodiments of the present application as would be understood by one of skill in the art.

In the called device 105, the processor 115 may execute instructions stored in the memory 120 and store information in the memory 120, such as the results of the executed instructions. Some embodiments of the processor 115 and the memory 120 may be configured to implement a call manager application 150 and a voice engine 155. In the depicted example, the voice engine 155 employs or references locale settings 160 to perform voice recognition or generation functions. The locale settings 160 may include grammar files, locale specific language model files, command recognition settings, text-to-speech settings, speech-to-text settings, etc. The processor 115, by executing the call manager 150 and the voice engine 155 performs portions of a method 200 shown in FIG. 2 and discussed below. For example, the processor 115 may execute instructions on the call manager 150 to handle incoming calls, such as a call from the caller device 110, and based on the privacy preferences of the called device 105, interact with the caller on the called device 110 to determine of the call should be allowed or suppressed. In one embodiment, the call manager 150 determines a locale preference associated with the user (caller) of the caller device 110 and temporarily configures the locale settings 160 for the voice engine 155 based on the caller's locale preference. One or more aspects of the method 200 may also be implemented using a remote device, such as a cloud computing resource 165 in addition to the call manager 150 and the voice engine 155.

FIG. 2 is a flow diagram of an illustrative method 200 for dynamically loading voice engine locale settings in accordance with some embodiments disclosed herein. In general, the called device 105 is capable of implementing various elements of the method 200 shown in FIG. 2. In some embodiments, the cloud computing resource 165 (see FIG. 1) may also be used to perform one or more elements of the method 200.

In method block 205, the called device 105 receives an incoming call from a caller device 110. If it is determined that a privacy flag on the called device 105 is set in method block 210, indicating that the called device 105 is in a private state, then the incoming call is accepted in the background, as indicated in block 220. The privacy flag may be set by the user (callee), or it may be automatically set based on a user (callee) calendar stored on the device 105. For example, the device 105 may automatically set the privacy flag during calendar appointments such as meetings. The event data stored in the callee's calendar may include a privacy setting that allows the user to indicate if incoming calls should be screened during the event. If the privacy flag is not set in method block 210, the call is accepted in the normal manner in method block 215, such as by displaying the call user interface on the device 105.

As noted above, if the privacy flag is set in method block 210, the call is accepted in the background (i.e., without ringing or displaying the call user interface) by the call manager 150 in method block 220.

A caller locale preference is identified in method block 225. The call manager 150 may use one or more techniques for determining the caller locale preference. In some embodiments, the caller may be associated with a contact record in the called device 105. A setting in the contact record may indicate the caller's locale preference. If the contact information for the caller is not existent or incomplete, the call manager 150 may employ the name, number and/or address associated with the caller device 110 to determine the caller locale preference. The number and name may be parsed from incoming caller ID data. The name and address may also be stored in the contact record associated with the number. In some instances, caller's name may be sufficiently associated with a particular locale, while in other cases, the name may be ambiguous. The call manager 150 may also employ a country code or area code to identify the caller locale preference. The call manager 150 may send the incoming caller name and/or phone number to the cloud computing resource 165 so that a lookup may be performed. In some embodiments, the caller's device 110 may communicate a designator for the caller locale preference as part of the session description protocol (SDP) employed in setting up the call between the devices 105, 110.

In method block 230, the locale settings 160 for the voice engine 155 are loaded with the caller's locale settings based on the determined caller locale preference. The caller's locale settings may include grammar files, locale specific language model files, command recognition settings, text-to-speech settings, speech-to-text settings, etc. The called device 105 may store a library of locale settings or the cloud computing resource may store such a library and forward the appropriate locale settings to the call manager 150 responsive to a request.

In method block 235, the caller is queried about the incoming call. In some embodiments, the voice engine 155 may generate the query message or a predetermined query message may be used. If the voice engine 155 generates the query message, the caller locale settings may be used to tailor the query message to the specific language or dialect preferred by the caller based on the text-to-speech functionality of the voice engine 155. If a predetermined query message is used, the call manager 150 may employ a library of query messages or it may interface with the cloud computing device 165 to retrieve a predetermined query message consistent with the caller locale settings.

In method block 240, the call manager 150 may parse a caller's response to the query message using the voice engine 155 configured in accordance with the caller's locale settings 160. Because the voice engine 255 is configured to recognize the caller's specific voice patterns, the accuracy of the voice recognition is increased. The caller may respond using the native language associated with the caller's locale. However, in some cases, the caller's locale settings may have been determined incorrectly by the call manager 150. For example, although the country code may suggest a certain locale, the actual caller may speak a different language or dialect than that which would normally be associated with the caller's country code.

In method block 245, the call manager 150 determines if the caller's response was understood. For example, the caller may be queried a predetermined number of times, and if none of the responses are understood by the system, the call manager 150 may determine that the caller cannot be understood in method block 245. If the caller's response is understood in method block 245, the call manager processes the call according to the response in method block 250. For example, the call manager 150 may accept the incoming call and display the incoming caller's user interface on the called device 105 if the message is urgent, or the call manager 150 may display a message on the display 135 of the called device 105 indicating a call back request from the caller.

In method block 255, the locale settings 160 for the voice engine 155 are restored to those of the callee. Thus, the locale settings are only changed during the interaction with the caller.

In method block 260, the contact record for the caller may be updated with the locale preference if it is not already stored therein. If the caller's interaction was successful in method block 245, the call manager 150 may assume that the determined caller locale preference was correct. The method terminates in method block 265.

If the caller's response is not understood in method block 245, the call manager queries the caller for a locale preference in method block 270 and resumes the method in method block 230 to reinitiate the query regarding the incoming call. In method block 265, a locale query message may be communicated, such as "Press 1 for English, 2 for English-India, 3 for Spanish, etc." The list of locale options may be prioritized based on the most likely locale, as determined from the available locale information. The contact record may be updated with the selected locale preference in method block 260.

If the user locale query in method block 265 is unsuccessful, the locale settings 160 for the voice engine 155 are restored to those of the callee in method block 255, as indicated by the dashed line. In such a case, the call manager 150 may process the incoming call in a predetermined manner, such as by routing the call to voice mail and providing a "call me back" message to the user of the called device 105. The updating of the contact record in method block 260 may be skipped.

Dynamically loading caller locale settings for the voice engine 155 as described herein increases the accuracy of the interaction between the system and the callee. Restoring the locale settings for the voice engine 155 immediately after concluding the interaction with the caller makes the interaction transparent to the user of the called device 105.

In some embodiments, certain aspects of the techniques described above may implemented by one or more processors of a processing system executing software. The method 200 described herein may be implemented by executing software on a computing device, such as the processor 115 of FIG. 1, however, such methods are not abstract in that they improve the operation of the devices 105 and the user's experience when operating the device 105. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes receiving an incoming call from a caller's device in a called device. A locale preference associated with the caller's device is determined. A voice engine in the called device is configured using locale settings associated with the determined locale preference. A query message is sent to the caller's device. A response to the query message is parsed using the voice engine. The incoming call is processed in the called device based on the response.

A device includes a transceiver and a processor to implement a voice engine. The processor is to receive an incoming call from a caller's device using the transceiver, determine a locale preference associated with the caller's device, configure the voice engine using locale settings associated with the determined locale preference, send a query message to the caller's device using the transceiver, parse a response to the query message using the voice engine, and process the incoming call in the called device based on the response.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
   receiving an incoming call from a caller's device in a called device;
   determining a locale preference associated with the caller's device;
   dynamically configuring a voice engine in the called device using locale settings associated with the determined locale preference of the caller's device;
   sending a query message to the caller's device;
   parsing a voice response from the caller to the query message using the voice engine; and
   processing the incoming call in the called device based on the voice response.

2. The method of claim 1, further comprising restoring the locale settings to a previous value of the locale settings after processing the incoming call.

3. The method of claim 1, wherein processing the incoming call comprises displaying a call back message on a display of the called device.

4. The method of claim 1, wherein processing the incoming call comprises displaying an incoming call interface on a display of the called device.

5. The method of claim 1, wherein determining the locale preference comprises determining the locale preference based on at least one of a number or a name associated with the caller's device.

6. The method of claim 1, wherein determining the locale preference comprises determining the locale preference based on a contact record stored in the called device and associated with the caller's device.

7. The method of claim 1, further comprising querying a user of the caller's device for the locale preference.

8. The method of claim 1, wherein determining the locale preference comprises receiving the locale preference from the caller's device.

9. The method of claim 1, wherein the called device is configured in a private state when the incoming call is received.

10. The method of claim 1, further comprising:
    sending caller data associated with the caller's device to a remote device to identify the locale preference; and
    receiving the locale settings associated with the locale preference from the remote device.

11. The method of claim 1, further comprising updating a contact record stored in the called device and associated with the caller's device based on the determined locale preference.

12. A device, comprising:
    a transceiver; and
    a processor to implement a voice engine, wherein the processor is to receive an incoming call from a caller's device using the transceiver, determine a locale preference associated with the caller's device, dynamically configure the voice engine using locale settings associated with the determined locale preference, send a query message to the caller's device using the transceiver, parse a voice response from the caller to the query message using the voice engine, and process the incoming call in the called device based on the voice response.

13. The device of claim 12, wherein the processor is to restore the locale settings to a previous value of the locale settings after processing the incoming call.

14. The device of claim 12, further comprising a display, wherein the processor is to process the incoming call by displaying a call back message on the display.

15. The device of claim 12, further comprising a display, wherein the processor is to process the incoming call by displaying an incoming call interface on the display.

16. The device of claim 12, wherein the processor is to determine the locale preference based on at least one of a number or a name associated with the caller's device.

17. The device of claim 12, further comprising a memory to store a plurality of contact records, wherein the processor is to determine the locale preference based on a selected one of the plurality of contact records and associated with the caller's device.

18. The device of claim 12, wherein the processor is to query a user of the caller's device for the locale preference.

19. The device of claim 12, wherein the processor is to receive the locale preference from the caller's device.

20. The device of claim 12, wherein device is configured in a private state when the incoming call is received.

21. The device of claim 12, wherein the processor is to send caller data associated with the caller's device to a remote device to identify the locale preference and receive the locale settings associated with the locale preference from the remote device.

22. The device of claim 12, wherein the processor is to update a contact record stored in the called device and associated with the caller's device based on the determined locale preference.

\* \* \* \* \*